July 30, 1968     T. H. THOMPSON     3,394,631
BELLOWS MECHANISM Filed Oct. 23, 1965     6 Sheets-Sheet 1

Fig.1.

INVENTOR
TOM H. THOMPSON
BY
ATTORNEY

July 30, 1968

T. H. THOMPSON

3,394,631

BELLOWS MECHANISM

Filed Oct. 23, 1965

INVENTOR
TOM H. THOMPSON
BY
R. Donham Owen
ATTORNEY

July 30, 1968  T. H. THOMPSON  3,394,631
BELLOWS MECHANISM

Filed Oct. 23, 1965  6 Sheets-Sheet 3

INVENTOR
TOM H. THOMPSON
BY
ATTORNEY

July 30, 1968  T. H. THOMPSON  3,394,631
BELLOWS MECHANISM

Filed Oct. 23, 1965  6 Sheets-Sheet 4

INVENTOR
TOM H. THOMPSON
BY
R. Donham Owen
ATTORNEY

July 30, 1968 T. H. THOMPSON 3,394,631
BELLOWS MECHANISM
Filed Oct. 23, 1965 6 Sheets-Sheet 5

INVENTOR
TOM H. THOMPSON
BY
ATTORNEY

Fig. 11

United States Patent Office 3,394,631
Patented July 30, 1968

3,394,631
BELLOWS MECHANISM
Tom H. Thompson, Ponce Inlet,
Daytona Beach, Fla. 32019
Filed Oct. 23, 1965, Ser. No. 504,028
5 Claims. (Cl. 92—46)

ABSTRACT OF THE DISCLOSURE

A flexible bellows in which the flexible annuli are spaced by spacing rings and triangle wedge shaped washers. The rings, washers, and annuli are retained assembled by an elastomeric coating which also operates as a seal. The coating is applied when the stack of rings, washers, and annuli are assembled and compressed to about half the maximum expected compression to thereby impart an initial stress to the coating in the finished bellows such that the flow of the coating during operation is minimal.

---

This invention relates to improvements in bellows of the type made from a plurality of individual flexible discs.

The invention has to do with the construction of bellows devices useful for transmitting motion and for other purposes and of the type in which the body portion of the bellows consists of a plurality of flexible washer members disposed one above the other, with means for sealing the outer and inner peripheries, alternately, of adjacent pairs of flexible washers to form a fluid-tight chamber the capacity or volume of which is expanded and contracted, respectively, as the washer members are flexed axially away from and toward one another.

Among the objects of the invention are the provision of an improved bellows of this type, simplification of the structure and its assembly and increasing the useful life of the device, while holding its cost to a minimum.

Thus an object of the invention is to provide a novel form of bellows that can be assembled from many individual circular pieces and then be converted into a single unit bellows component by coating the parts with a material having good clinging power and good flexing characteristics.

Another object of the invention is to provide a form of bellows having in one such assembled unit multi-stage characteristics, accomplished by the use of flexible discs of different flex strengths, or of different external diameters or different internal diameters.

Another object of the invention is to provide a structure whereby flexible discs of relatively light flex strength may be used and will be supported during certain additional flex stages in the operation of other discs of the bellows unit.

Another object of the invention is to provide an easily replaceable bellows flexing unit as a complete component ready for insertion in the bellows chamber.

Another object of the invention is to provide a sealed bellows having flexing ability exceeding that of a one-piece corrugated conventional bellows, and which is made at less cost from a plurality of relatively inexpensive parts.

Another object of the invention is to provide a bellows of low-cost and substantially infinite life.

Another object of the invention is to provide a bellows having no physical limit as to length of movement obtainable, which object is achieved by adding together in the bellows as many flexible discs and spacing washers as are needed.

Another object of the invention is to provide a bellows adaptable to the pumping of sludge or solids suspended in fluids.

Another object of the invention is to provide a novel method for making bellows units.

Another object of the invention is to provide a closed receptacle adapted for activation as part of a motion transfer system.

Another object of the invention is to provide a bellows made from a plurality of concentric parts which are self-aligning when being assembled prior to coating to form them into a unit.

Another object of my invention is the provision of a rugged yet relatively small bellows power unit adapted for use in actuating wheel brakes and other like compact mechanisms: (a) where space is at a premium; (b) where the parts are subject to vibration and shock; or (c) where variations in application pressure are important as the bellows passes through its operating range.

Because my invention is adapted to use in so many different types of mechanisms, calling for the generation of fluid force or for actuation by fluid force, I shall confine my description to the basic power unit itself. Examples of uses for my improved and novel form of bellows units are these:

(a) In the brake housings of vehicles where my novel bellows units may be used to apply the brake applying force to the brake shoes;

(b) In the suspension systems of vehicles as well as delicate computer machinery and the like;

(c) In the pump field where my novel bellows units may be used to replace conventional pistons and cylinders in order to impel liquids containing solid particles such as various slurry mixes found in industry;

(d) In the automated machinery field where my novel bellows units may be used in the motion transfer systems that control the machine;

(e) In the accumulator field where energy may be stored in bellows units made as described herein; and (f) In the self-damped, supporting and vibration insulating suspension units for machinery, vehicles, etc.

The above examples are merely illustrative and are not intended to limit the invention.

In one of its aspects my invention can be described as a power unit adapted for actuation by fluid pressure or for the generation of fluid pressure comprising a housing having a chamber therein; a power applying ram movable axially in said chamber with means adapted to be connected to the actuated part; means for introducing fluid into said chamber; and closure means on the end of said chamber; said power unit having mounted in said chamber between said closure means and its other end, an axially flexible bellows unit composed of a plurality of individually flexible disc-like washers, a rigid tapered washer between each adjacent alternate pair of said flexible washers and contacting said flexible washers near one of their peripheries, a spacer washer between the outer face of the flexible washer of each of said alternate pairs, each spacer washer contacting said flexible washer at its periphery opposite to the other peripheral contact, and sealing means on said washers at least adjacent and covering the areas of contact.

Another aspect of my invention is the sub-combination comprising the unitized bellows component which I provide as a complete replacement or assembled unit, for this as well as for many other uses. This unitized bellows component is composed of: (a) a plurality of flexible disc-like washers, (b) a rigid tapered washer between each adjacent alternate pair of said flexible washers and contacting said flexible washers near one of their peripheries, (c) a spacer washer between the outer face of the flexible washer of each of said alternate pairs, each spacer washer contacting said flexible washer at its periphery opposite to the other peripheral contact, and (d) a sealing means on said washers at least adjacent and covering the areas where the washers contact each other.

The servicing and original manufacture of equipment using my bellows invention is greatly facilitated by being able to sell the unitized bellows component as a complete self-contained article. Another advantage too is that the manufacturer can supply the bellows components assembled from washers of different flex strengths and/or different diameters so the user can select a plurality of different components to go into the bellows chamber and thereby the user can get varying rates of application of force to the system.

Other features, objects and advantages of the invention will be apparent from the following description of various forms which it may take and from the accompanying drawings.

To make the structure clear in the drawings the thickness of the parts, particularly the flexible discs, has had to be shown thicker and out of proportion to the actual device as made and sold. Actually, what thickness of flex discs are used will depend upon the job to be done by the bellows unit. Also the thickness of the coating which joins the discs is exaggerated in the drawings.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
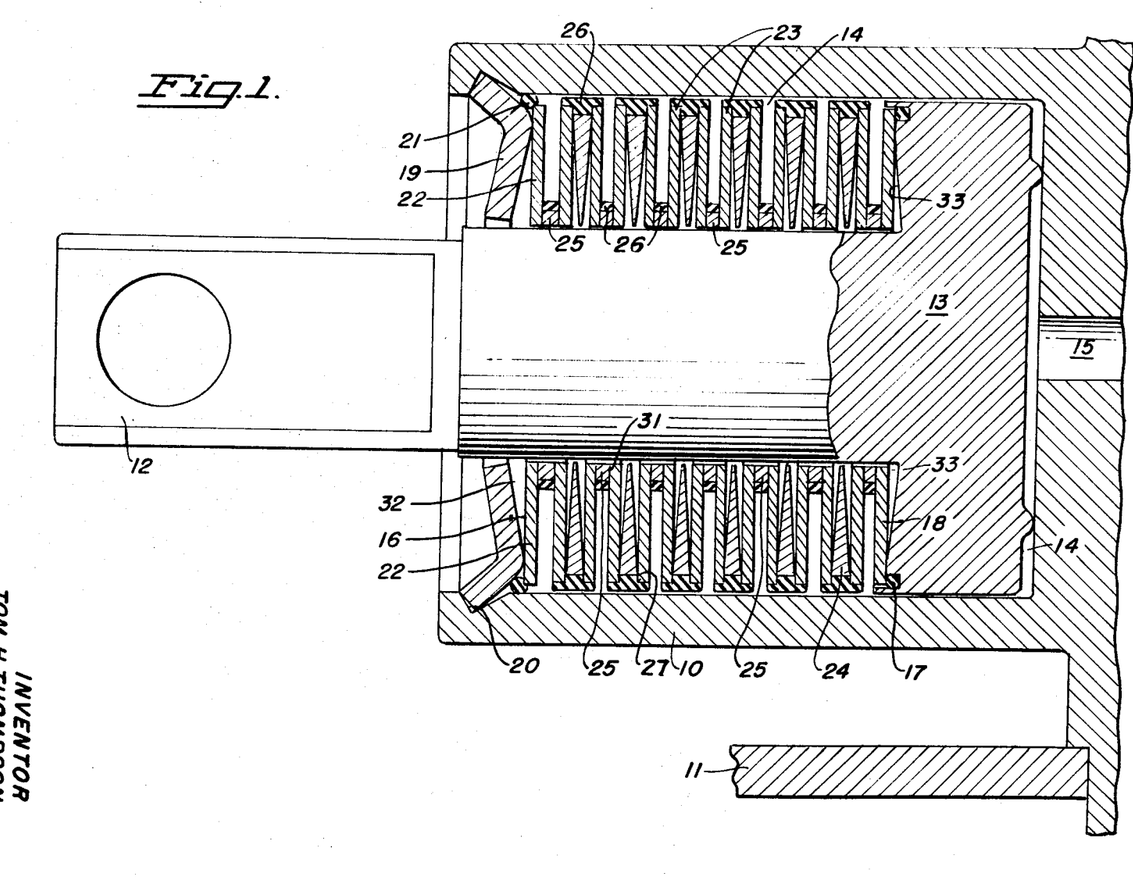
FIG. 1 is a sectional view showing my improved power unit in a preferred form as applied to use in a vehicle brake. The power unit is shown at rest with the bellows component under a slight pre-load in the chamber. Here the fluid under pressure is fed into the chamber where it envelops the exterior of the bellows unit and causes the ram to move to actuate the brake.
Figure 2:
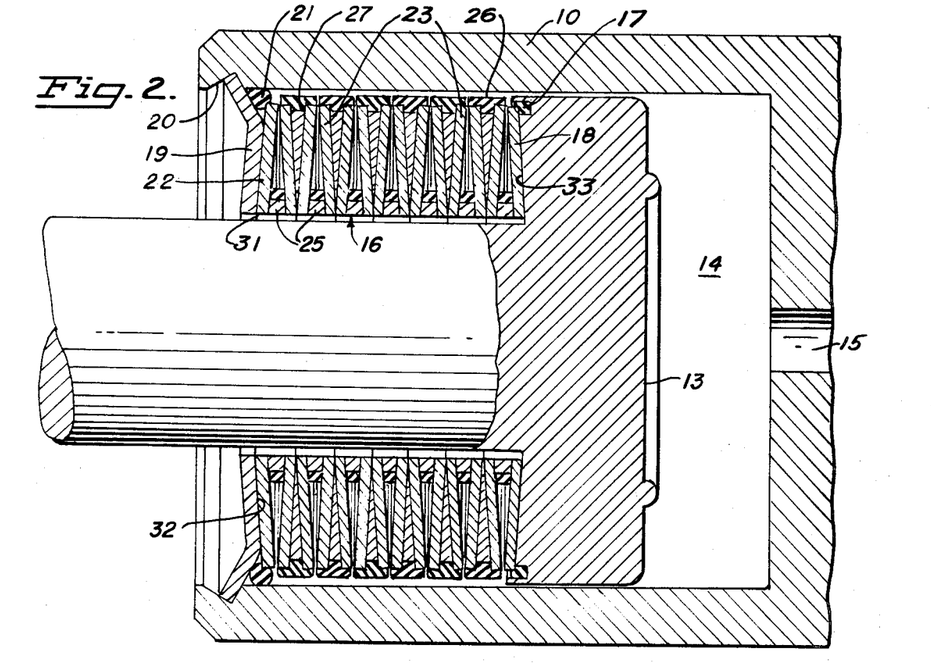
FIG. 2 is a view similar to FIG. 1 showing the position of the parts when the fluid pressure has moved the ram to the end of its stroke with the bellows component fully collapsed.
Figure 3:
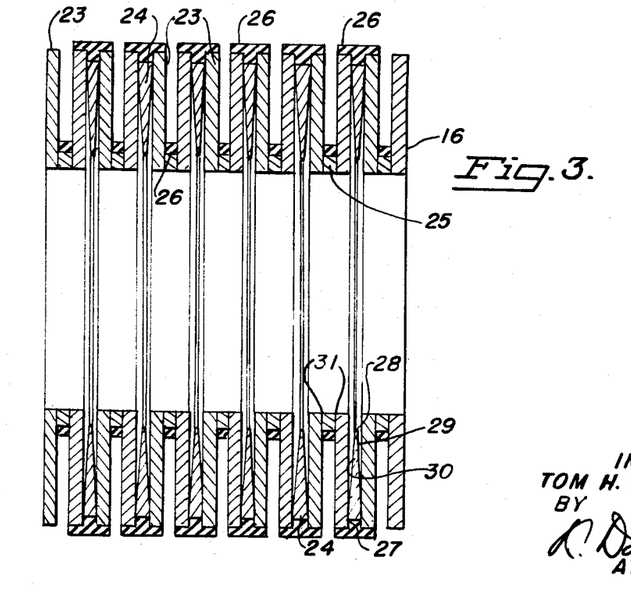
FIG. 3 is a view similar to FIG. 1 showing the unitary bellows power unit removed from the chamber and as it is when sold as a replacement or assembled part. It is slightly longer than the chamber into which it will be fitted so that when secured by the end closure plate it is slightly pre-loaded so that all washer members and end plates are in direct contact.

Referring now more particularly to FIGS. 1, 2 and 3 of the drawings, the numeral 10 designates a wheel brake housing secured to the backing plate 11 of a vehicle axle. Mounted on the backing plate are the brake shoes (not shown) which have a suitable linking mechanism (not shown) adapted to be engaged by the ram extension 12. Movement of the ram 13 in the chamber 14 in the housing 10 pushes the brake shoes against the wheel drums to slow the vehicle. The fluid which moves the ram 13 comes from the master cylinder (not shown) which is activated by the driver when he presses on the foot pedal (not shown). This fluid enters the housing 10 through the inlet 15 and it floods the interior of the chamber 14.

In the chamber 14, behind the head of the ram 13 is placed a bellows unit 16 which bears against the backside of the ram 13 where an O ring 17 seals against one end washer 18 of the bellows unit 16. At the other end the chamber 14 is closed by a "Welsh Plug" 19 which is locked into the housing 10 by means of the annular recess 20. An O ring 21 seals between the "Welsh Plug" 19 and the end washer 22 of the bellows unit 16 and also between the "Welsh Plug" and the chamber wall. The normal manufactured length of the bellows unit 16 before installation is slightly longer than the distance between the backside of ram 13 and the inner face of the Welsh-Plug 19 so that the bellows unit 16 is preloaded to assure a seal at both ends, and to insure that all washers are in direct contact with their respective support pivots.

An important part of the present invention is the bellows unit 16 which will now be described in detail. This unit is intended to be made at the factory as a unitary component adapted to be sold as a replacement part or to be used on the assembly line where the brake cylinder housings 10 are put together.

The bollows unit 16 is axially flexible and is made up of a plurality of individual, flexible disc-like washers 23, with a rigid triangle wedge shaped tapered washer 24 between each adjacent alternate pair of said flexible washers 23. These washers 24 contact the flexible washers 23 near their outer periphery. There is also a spacer washer 25 between the outer face of the flexible washer 23 of each of said alternate pairs, each spacer washer 25 contacting a pair of flexible washers 23 at their inner peripheries, which contact is opposite to the other peripheral contact of the washers 24 and 23.

In the manufacture of the bellows unit 16 when the parts so far mentioned have been assembled on a mandrel or other suitable jig, an elastomeric or like coating 26 is applied. This coating 26 is shown in the drawings where it is sectioned for rubber.

There are several reasons, and possibly some others not now appreciated, for this coating of the parts.

In the first place, this coating 26 assembles and holds all the several washers into a unitary component, making it easy to handle in the factory and in the field.

In the second place, this coating 26 serves to form a flexible seal between each of the adjacent washer surfaces thereby avoiding the necessity for special treatment of the mating surfaces. In practice, stampings and castings have been found to be usable.

The coating may be applied in several ways, either by dipping, by spraying, by brushing, or electrostatically.

Any method of coating may be employed which results in applying a coating that seals at the surface contact areas.

A third advantage of the coating is as a corrosion preventative. This is especially important where the device is used in pumping installations.

I prefer to apply the coating when the assembly of washers is compressed to about one-half of its maximum compression. What I have found that this does is to give the coating a maximum quality of performance with a minimum flow or movement of the coating material.

One of the benefits from my invention is that from washers of the same or different diameters, bellows units can be made having any desired range and/or rates of compression. The greater the compression range needed, the more washers that are assembled to make up the unit. To get different rates of compression through the operating range of the unit, washers of the proper size or flex-strength are selected and assembled. This feature of different compressive rates obtained by using flexible discs 23 having different flex strengths and/or different diameters is referred to later on as the multi-stage characteristic.

This advantage of a bellows unit 16 made by selecting two or more groups of flexible discs 23 having different flex strengths or diameters, produces a bellows unit having a progressively variable rate of compression. The variance can be without limit depending upon the flex strength or diameters of the discs 23 selected. For example, a plurality of one strength or diameter of discs can be assembled in the jig, then a plurality of another strength or diameter can be assembled adjacent the first set. When coated and installed in a housing, the operating characteristic will be that the initial activation will result in the set of discs 23 most easily flexed moving into the position of full compression as shown in FIG. 2, while the set of discs 23 less easily flexed will still have the major part of their compression to go.

Another function performed by the flexible discs 23 is to retract the ram when the fluid pressure is released. It takes the place of a return spring in many installations. However, there may be installations where it is desirable to make the bellows from discs made of metal with a minimum of spring-back. In this case when the bellows unit is first flexed, it will take a set and assume the desired size or return stroke wanted.

While I have shown a Welsh-Plug 19 as the dead-end closure means in FIGS. 1 and 2, any other closure means may be used. For example, in FIGS. 4 and 5 the closure plate is held in place by suitable screws.

Figure 8:
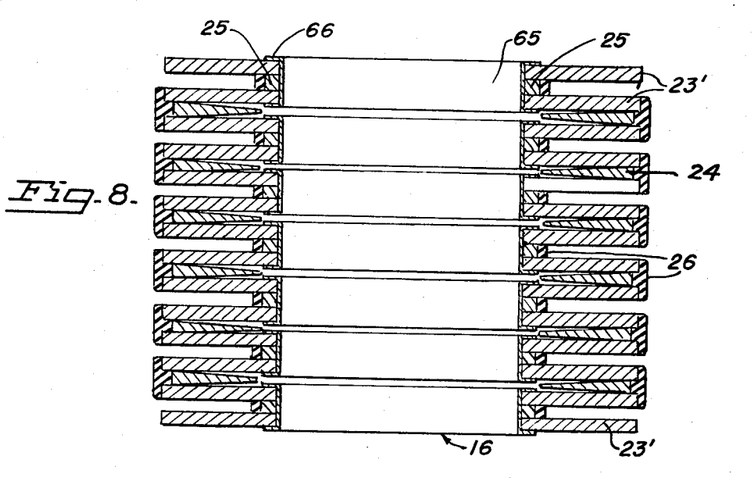
FIG. 8 is a view in cross-section of a bellows unit adapted to fit in the chamber of FIGS. 1 and 2, wherein each adjacent pair of flexible discs are secured together at their inner edges by an annular collar. This form is preferable when easily flexed discs are used. Also in this case the tapered washers may be cut back as shown to allow clearance for travel of the collars toward each other.

The washers 24 are preferably made with a triangle wedge or V-shaped cross-section. Their functions are: first, to provide a peripheral pivoting point 27 for each flexible disc 23 where it bears on the washer 24; second, to provide the rim 28 at the opposite periphery to maintain concentricity of the component washers during assembly and coating; and third, to provide support at 29 and 30 for the flexible discs 23 should overloading occur. In those cases where the collar 65 is used as shown in FIG. 8, clearance for the flanges 66 may be obtained by eliminating the tapered point of each washer 24. This will allow the bellows unit with the collars 65 to attain a full compressive stroke.

The second point made above indicates that the periphery 28 need not be continuous, nor the diameter of the discs the same, so long as there are enough spacer points to accomplish centering.

These washers 24 may be made of a plastic, of rubber, metal or other material.

It will be noted in the drawings that the inside face 32 of the Welsh-Plug 19 and the back face 33 of the ram 13 have a conical surface, preferably at about the same slope as washers 24.

Figure 8A:
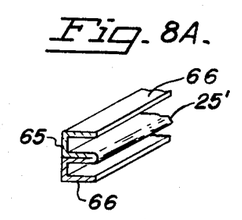
FIGS. 8a, 8b and 8c show different forms of the clamping collar.
Figure 8B:
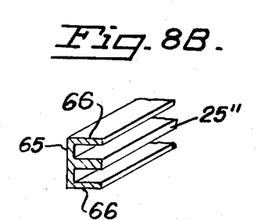
Figure 8C:
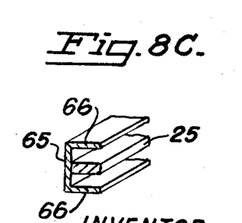

The washers 25, located adjacent the periphery of the flexible discs 23 opposite the peripheral contact 27 with the washer 24, also provide a pivot area 31 for the flexible discs 23. These washers 25 are shown as having a rectangular cross-section, but this shape is not vital. They may be made from plastic, metal or other materials hard enough to function as a pivot. They are self-centering. In the modifications shown in FIGS. 8, 8a, 8b and 8c the washer 25 takes different forms. In FIG. 8a the washer 25' is a rib formed from the same material as the annular collar 65. Collars 65 and 66 are welded or otherwise fastened at their adjacent contacting surfaces. In FIG. 8b the washer 25" is an integral part of the annular collar 65. In FIG. 8c the washer 25 is as it is in FIG. 8 and the annular collar 65 is a separate piece.

Figure 4:
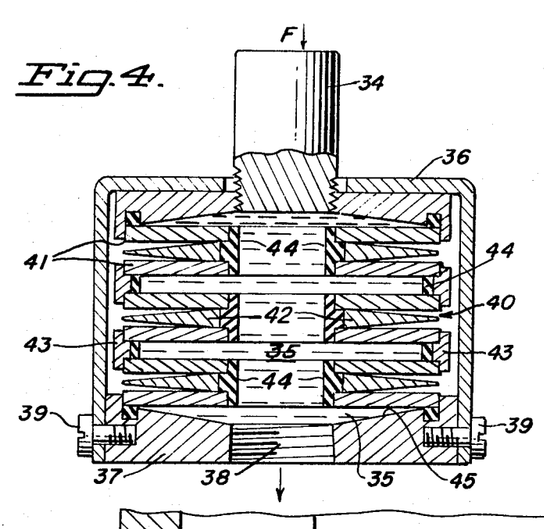
FIG. 4 is a view of the power unit in a form where external power is applied to the ram to generate pressure in the fluid system as a result of collasping the bellows power unit. Here the fluid being put under pressure fills the inside of the bellows unit.
Figure 5:
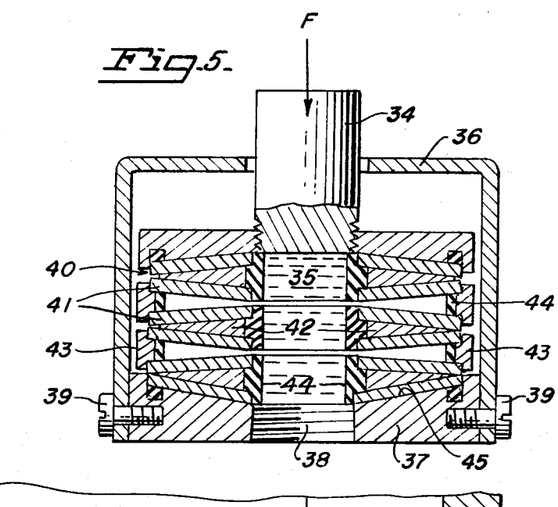
FIG. 5 is a view similar to FIG. 4 showing the position of the parts when the external power has moved the ram to the end of its stroke with the bellows component fully collapsed in the chamber.

Referring now to FIGS. 4 and 5, there is shown a form of the invention used as a fluid pressure generator or power ram. In other words, here the outside force F is applied to the ram 34 to put the fluid 35 under pressure to actuate the slave unit shown in FIGS. 1 and 2. This is known generally as the internal pressure type, that is, the fluid is on the inside of the flexible bellows structure.

Here the housing 36 has a closure plate 37 with a threaded hole 38 to receive a pressure connection (not shown). Screws 39 hold together the housing 36 and the closure means 37. In the arrangement of FIGS. 4 and 5 the bellows unit 40 has the flexible discs 41, V-shaped washers 42 and the T-shaped washers 43. In this case the fluid 35 is on the interior of the bellows unit 40. Here, as is the case of the bellows unit 16 of FIGS. 1, 2 and 3, the bellows unit 40 is coated as at 44. The reasons for this coating are the same as those already explained above.

In FIG. 4 the bellows unit 40 is pre-loaded due to the fact that the unit 40 is slightly longer than the distance between the bell housing 36 and the inside face 45 of the housing closure plate 37.

In FIG. 5 the bellows unit 40 has been fully compressed due to a force applied at the end of the ram 34.

The difference in number of flexible discs 23 in FIGS. 1, 2 and 3 and the like discs 41 in FIGS. 4 and 5 illustrates the versatility of my invention. In the latter case less travel was needed. As many pairs of discs 23 or 41 are used as are needed to give the desired travel range for the ram.

Also while mentioning the subject of discs 23 and 41, it will be seen that by selecting some discs of less flex strength than the others, as well as discs of varying diameters, the bellows unit will be what I call a multi-stage unit. What happens is that the discs of less flex strength will compress first and will require less force, and thereafter more force will be required to compress the next set of discs. The versatility thus obtainable by my invention can be important in certain application of bellows devices.

Figure 6:
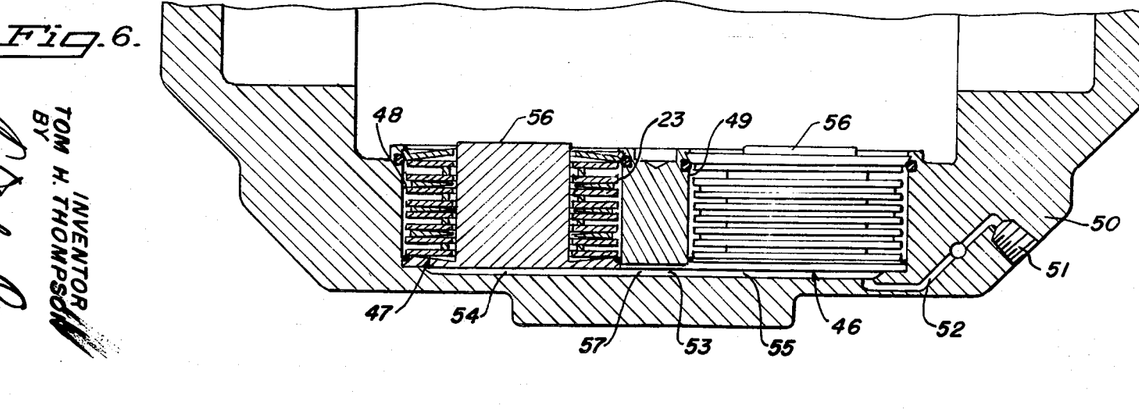
FIG. 6 is a like view of the invention as mounted in a disc brake housing on a vehicle using the external fluid pressure type bellows as in FIG. 1.

In FIG. 6 I have illustrated my invention as applied in the housing of a disc brake. It will be noted how compactly these two power units 46 and 47 fit in the recesses 48 and 49, respectively. The fluid under pressure enters the housing 50 at the opening 51 and flows through a conduit 52 to manifold 53, and to the two chambers 54, 55. The fluid here, as in the case of FIGS. 1 and 2, surrounds the bellows power units 46 and 47. Each power unit 46 and 47 has a ram 56 that is moved outwardly by the pressure of the fluid 57 in the manifold 53. Upon release of the pressure of the fluid 57, the flexible discs 23 flatten out and return the ram 56 to its starting point.

The bellows unit as used in the FIG. 6 environment may want to be one which will not spring-back to its starting point. In that case, as previously mentioned, the discs will be made of material with less resiliency and more inclined to take a set and yet have some spring-back. This achieves two things when employed in a brake unit. It allows the bellows unit to adjust itself to its needed stroke position or automatic wear compensation position; and it shortens the pedal travel needed to a minimum when applying the brake.

Figure 7:
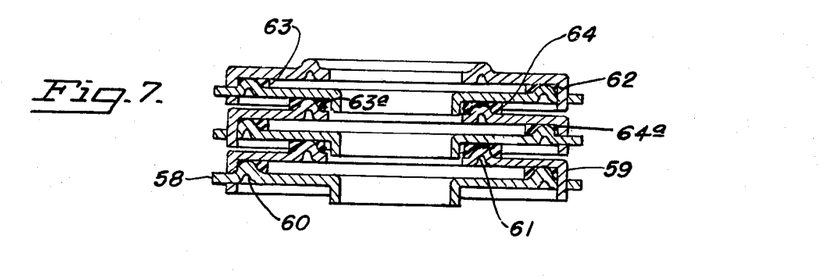
FIG. 7 is a like view of the invention employing flexible discs which have an embossed ridge on the periphery of each disc in lieu of a separate washer.

In FIG. 7 I have illustrated a form of flexible discs 58, 59 each having an embossed ridge 60 and 61, respectively. These ridges take the place of the washers 24 and 25 illustrated in FIGS. 1, 2 and 3. The discs 58 and 59 are self-centering because of the turned down edges 62. Here, as in the case of FIGS. 1 to 6, the assembled discs are coated at 64 and at 64a for the bellows unit that is to have the fluid on the outside periphery and at 63 and at 63a for the bellows unit that is to have the fluid on the inside periphery. In those cases where a bellows unit is to be subjected to fluid pressure on the inside as well as on the outside, the coating 26 will be at 63, 63a and 64, 64a. This double coating is also useful in holding the parts in assembled form and in preventing corrosion. The latter is particularly true in handling corrosive fluids. The notched peripheries of the discs can provide torsional loading if required.

Referring to FIGS. 8, 9, 10 and 11, what I show here is the form of bellows unit to be used where relatively softer or more easily flexed discs 23 or 41 are required to give the ease of travel needed.

In FIG. 8 is shown the bellows unit 16 adapted to fit the chamber in FIGS. 1 and 2. It is substantially identical with the bellows unit 16 of FIG. 3, except (a) that the flexible discs 23' are of thinner material than the discs 23 of FIG. 3, (b) that the annular collar 65 is added to secure as a sub-unit each pair of discs 23' with a spacer 25 in between, and (c) that the tip end of each tapered support washer 24 is omitted to avoid interference with the flange 66 on each collar 65. The annular collar 65 may be spun on or otherwise brought down on each disc 23 near its inner periphery so that the rim 66 will hold the two discs and the spacer 25 assembled. The collar 65 is made strong enough to withstand any net pressures that are applied on the adjacent pair of discs 23' tending to lift them off the washer 25.

As noted earlier, in FIG. 8a the annular collar 65 is in the form of a single piece of metal with the washer 25' formed of the same piece of stock. In FIG. 8b the washer 25" and the collar 65 are made from one piece. An alternative would be to have two annular collars welded together to do the job. In FIG. 8c the washer 25 is a piece separate from the collar 65.

Figure 9:
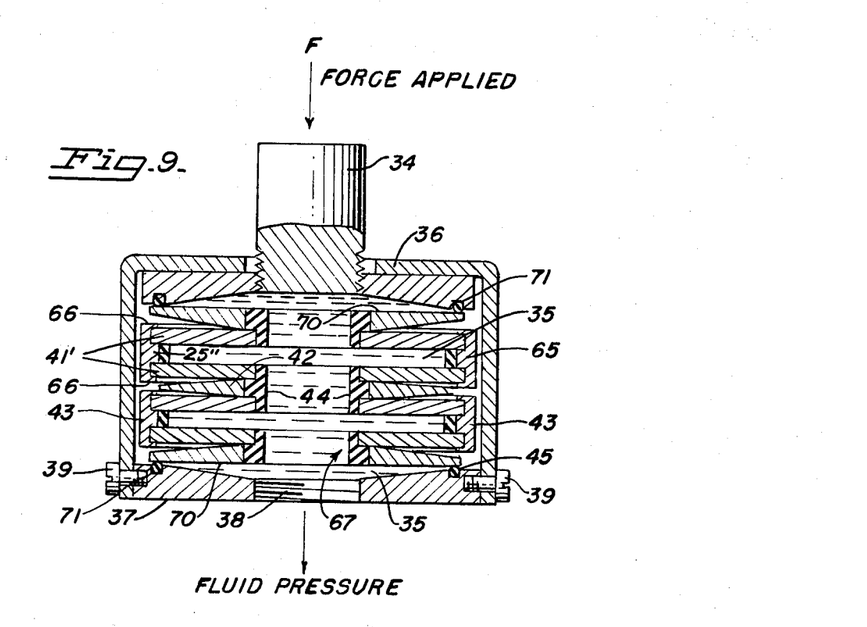
FIG. 9 is a view like FIG. 4 showing the form the bellows unit can take when an annular collar is used to secure together at their outer peripheries each adjacent pair of flexible discs.
Figure 10:
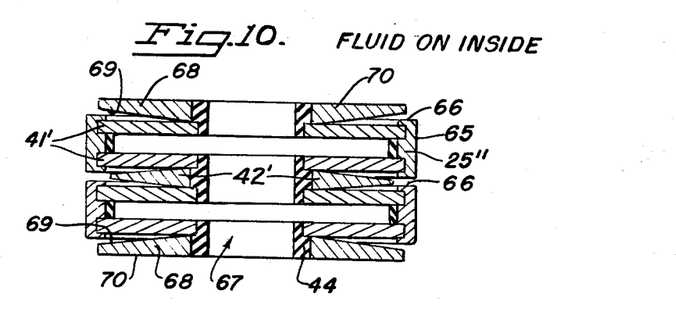
FIG. 10 is one form the bellows unit can take when made in relatively soft or easily flexed discs requiring the collar.

In FIGS. 9 and 10 I show the device of FIGS. 4 and 5 with a bellows unit having a soft action—that is, one in which the discs 41' flex easily. There is no difference in the housing—the only difference being in the bellows unit 67. As shown in FIG. 10, this unit 67 is made up of the flexible discs 41' and the wedge or V-shaped space washers 42' with their tips omitted. In the case of the easily flexed discs 41' the V-shaped washers 42' are of more importance in providing support for the discs 41' and in preventing cupping than is the case with the stiffer discs 41 in FIGS. 4 and 5. Omission of the tips, to allow the adjacent flanges 66 on the collars to come into contact does not rob the discs 41' of the desired support.

The bellows unit 67 shown in FIG. 10 differs from the bellows unit 40 used in the device of FIGS. 4 and 5 in several particulars: (a) The flexible discs 41' are more easily flexed; (b) The outer peripheries of the discs 41' are held between a spacer 25" which is part of an annular collar 65 having its rims 66 spun over to secure the discs in place; and (c) Each end washer 68 is shaped on one side with a slope 69 to support the disc 41' and is shaped on the other side 70 to engage the O ring 71. The collar 65 has a cross-section that might be referred to as an E or a W or an M (see FIGS. 8a, 8b or 8c).

Figure 11:
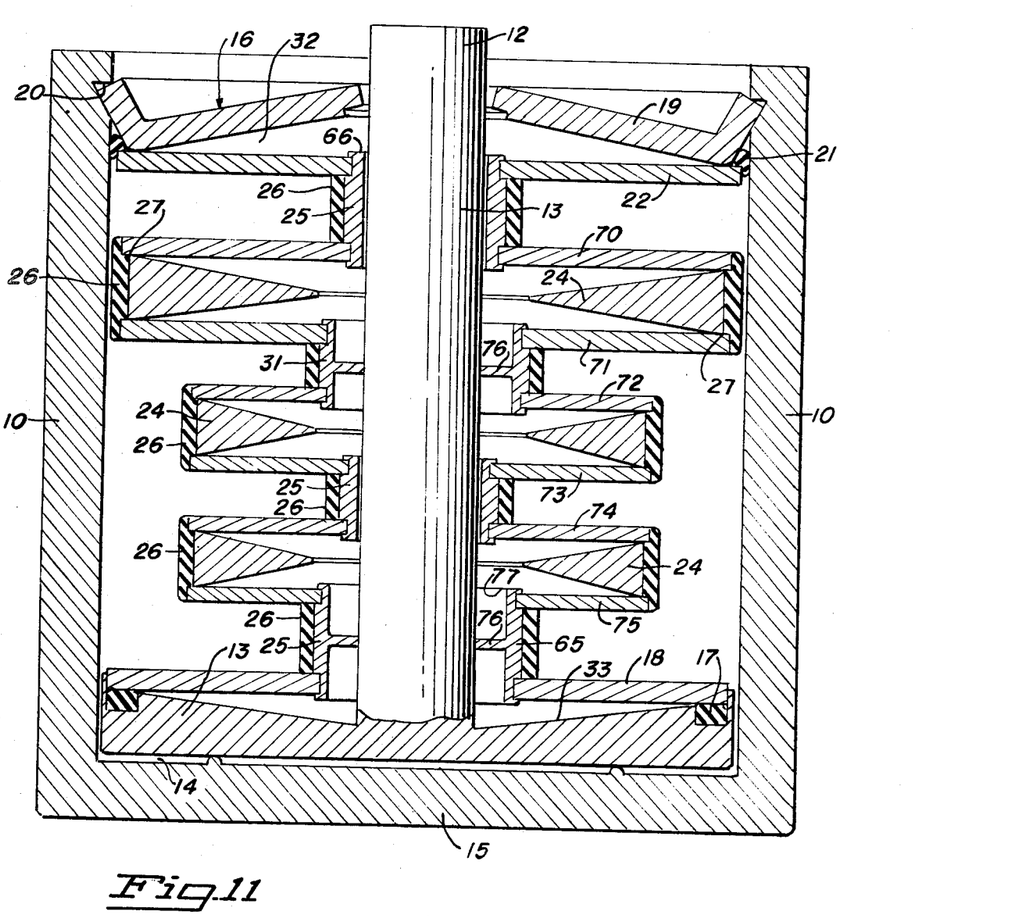
FIG. 11 shows a more sophisticated form of my invention in which are illustrated in one drawing a number of variations to accomplish special results as will be explained later.

Using the same basic parts numbers as in FIG. 1, supplementing them with additional numbers where needed, I have illustrated in FIG. 11 one of my coated bellows units with most of the variables combined into this one unit. Because of the limitations inherent in any drawing, it is not possible to do more than indicate the structure in a general way. The person building the unit would include whatever number of discs were needed to attain the stroke and the characteristic of each rate of travel or compression ratio desired.

The bellows unit 16 in FIG. 11 is made up of the plurality of individual, flexible disc-like washers made in various sizes and thicknesses as shown at 18, 22, 70, 71, 72, 73, 74 and 75. A rigid tapered washer 24 is placed between each adjacent alternate pair of the flexible washers. These tapered washers 24 contact the flexible washers near their center periphery in this FIG. 11 because this bellows unit is intended to have the fluid medium on the outside of the unit. Where the fluid medium is to be on the inside then the washers 24 will have their taper point outwardly as in FIG. 4.

There is also the spacer washer 25 between the outer face of the flexible washer of each of said alternate pairs, each spacer washer 25 contacting a pair of flexible washers 22–70, 71–72, 73–74 and 75–18 at their inner peripheries which contact is opposite to the other peripheral contact of the tapered washers 24.

In FIG. 11 I use the collars 65 with the turned in rims or flanges 66. Also the very end tip of each tapered washer 24 is omitted to allow clearance for the flanges 66 as they move toward each other. By means of the spacer flanges 76 on the collar spacers 65 I support the collar in relation to the ram 13 and also provide the recess 77 into which the flange 66 of the adjacent collar 65 will rest when the bellows unit is at its maximum pressed position.

I shall now explain wherein FIG. 11 shows some of the variations in stroke, in compressive resistance, and other desirable operating characteristics possible with my invention.

It is possible to obtain variation by using spring discs 22 of different thickness. In FIG. 11 the top three discs 22, 70, 71 and the bottom disc 18 are of similar thickness and are thicker than the four discs in between. This means that any travel of the ram 13 will cause a flexing of the thinner in between discs 72, 73 74, 75 to a greater extent than of the thicker discs. As movement of the ram 13 continues the thinner discs 72, 73, 74 and 75 will come to bear on the tapered washers 24 while the thicker discs 22, 70, 71, 18 are still spaced away from their adjacent washers 24. At this point it will take more pressure on the ram 13 to move it. Thus is achieved a bellows unit which gives different operating characteristics during the stroke of the ram 13. It begins with a soft stroke and changes to a hard stroke. By combining the desired number of stiff discs and soft discs my invention makes it possible to tailor the bellows unit to fit each need.

Another way of achieving a variable characteristic is to vary the inside or the outside diameter of the discs. Referring to FIG. 11 the discs 22, 70 have the minimum inside and maximum outside diameter that can be fitted in the chamber 10. The discs 71, 18 have the maximum outside diameter and a less than minimum inside diameter. Assuming discs 71, 18 to be the same thickness and material as the discs 22, 70, discs 71, 18 will be stiffer and take more force to cause them to flex. Thus the discs 71, 18 will impart to the bellows unit a different operating characteristic than will the discs 22, 70. Because of lack of space only two discs 71, 18 are shown. It should be understood that several discs like 71, 18 may be assembled if that is the characteristic wanted.

Another variation can be obtained by reducing the outside diameter of the disc. This is shown with the discs 72, 73, 74, 75 which are both thinner and of lesser diameter than the discs 71 and 18. The discs 75 and 72 have a stiffer action and flex less easily than do the discs 73 and 74, due to larger inside diameters, assuming these four discs to be the same thickness.

The net result of my invention is that a bellows unit can be tailor-made to fit the requirements of each installation. The length of travel is determined by the number of pairs of discs included in the assembly. The force required to accomplish each unit of travel can be determined by the flexing characteristic of each pair of discs assembled in the bellows. Summarized, these variations are achieved by:

(1) Varying the thickness of the spring discs;
(2) Varying the inside diameter of the discs;
(3) Varying the outside diameter of the discs;
(4) Pairing large and small discs;
(5) Pairing thick and thin discs; and
(6) Providing for nesting of the collars.

The coating material 26 which serves to hold all the parts of the bellows unit 67 in assembled form so it can be sold and handled as a unit may be any suitable elastomer, synthetic or rubber-like material which has a strong adhesive quality and the necessary flexibility to adjust as the washers flex and work relative to each other.

Earlier I made reference to the advantage of my invention as making it possible for fluid-actuated power-units to be tailor-made and assembled with a multi-stage characteristic. This is important in many types of machines. An example is in an automobile braking system where the first stage of movement calls for light pressure as when moving the brake shoes up to contact with the brake drums or brake discs, and then the second stage of movement calls for a heavier pressure to push the brake shoes against the drums or discs. This is cared for in my invention by calculating the extent of ram and related bellows movement necessary for each stage. For the soft stage, enough of the more flexible discs 72, 73, 74, 75 are assembled so that at the end of the soft stage the discs are in or near contact with the wedge-shaped washers 24. For the hard stage, enough of the discs 22, 70, 71, 18 with a stiffer flex rate are assembled so that when the maximum movement is reached, these discs will be in or near contact with the wedge-shaped washers 24 between each adjacent pair of discs.

It is clear that more than two rates of power can be combined in one power unit—also, that this can be accomplished by assembling all the flexible disc pairs in one unit and coating it or by coating each like group of flex discs to make a unit of each and then placing these units in the housing or chamber 36.

What I claim is:

1. A bellows comprising a stack of flexible annuli, a spacing ring between alternate pairs of annuli at one periphery, a triangle wedge shaped ring having substantially the same inner and outer diameters as said annuli positioned between intermediate pairs of alternate annuli and having the base of the wedge adjacent the opposite periphery, and elastomeric means bonded to said rings and annuli for securing the rings to the annuli and sealing the surfaces therebetween.

2. A bellows as defined in claim 1 wherein the flexibility of some of the annuli is different from the flexibility of other annuli.

3. An expansible chamber device comprising a cylinder, a plunger reciprocably mounted in the cylinder, and a bellows in said cylinder between the plunger and cylinder, said bellows comprising a stack of flexible annuli, a spacing ring between alternate pairs of annuli at one periphery, a triangle wedge shaped ring having substantially the same inner and outer diameters as said annuli positioned between intermediate pairs of alternate annuli and having the base of the wedge adjacent the opposite periphery, and elastomeric means bonded to said rings and annuli for securing the rings to the annuli and sealing the surfaces therebetween and means sealing the terminal annuli of the stack to the cylinder and plunger against flow of fluid.

4. A device as defined in claim 3 wherein the surfaces of plunger and cylinder adjacent the terminal annuli of the stack are tapered congruent to the taper of the wedge of the ring.

5. A device as defined in claim 3 wherein the cylinder is provided with an orifice coaxial with the axis of the bellows.

References Cited
UNITED STATES PATENTS

| | | | |
|---|---|---|---|
| 82,276 | 9/1868 | Belleville | 92—46 X |
| 781,939 | 2/1905 | Fulton | 92—34 X |
| 995,444 | 6/1911 | Dillion | 92—45 |
| 1,341,669 | 6/1920 | Porter | 92—45 X |
| 1,717,196 | 6/1929 | Emmet | 92—45 |
| 1,826,597 | 10/1931 | Brecht | 267—1 |
| 2,162,719 | 6/1939 | Hay | 267—1 |
| 2,487,288 | 11/1949 | Williams | 92—45 |
| 2,577,908 | 12/1951 | Nakken | 92—46 |
| 2,655,935 | 10/1953 | Kinzbach | 267—1 |
| 2,657,074 | 10/1953 | Schwester et al. | 92—34 X |
| 2,889,781 | 6/1959 | Thompson | 92—45 X |
| 2,973,015 | 2/1961 | Thompson | 92—46 |
| 3,010,713 | 11/1961 | Turkovich | 267—1 |
| 3,099,189 | 7/1963 | Blondiau. | |

MARTIN P. SCHWADRON, *Primary Examiner.*

I. C. COHEN, *Assistant Examiner.*